United States Patent [19]

Lin

[11] Patent Number: 4,515,362

[45] Date of Patent: May 7, 1985

[54] EXERCISE TRICYCLE

[76] Inventor: Chin-Lung Lin, No. 692, Shan-Hsing-Chiao, Shiang-Shan Shiang, Hsing Chu Hsien, Taiwan

[21] Appl. No.: 387,749

[22] Filed: Jun. 11, 1982

[51] Int. Cl.³ .................... B62M 1/16; A63B 23/00
[52] U.S. Cl. ..................................... 272/114; 272/93; 272/73; 280/243; 280/265
[58] Field of Search ................... 272/96, 114, 115, 73, 272/72; 280/242, 243, 11.19, 11.2, 11.33, 225, 233, 88, 263–265, 270, 271, 234, 242 WC; 46/213

[56]         References Cited
         U.S. PATENT DOCUMENTS

| 84,163 | 11/1868 | Blake | 280/243 |
|---|---|---|---|
| 193,919 | 8/1877 | Bush | 280/88 |
| 233,691 | 10/1880 | Palmer | 280/270 |
| 247,156 | 9/1881 | Bridgman | 280/265 |
| 1,620,926 | 3/1927 | Trullinger | 280/234 |
| 1,777,237 | 9/1930 | Watson | 280/88 |
| 2,028,445 | 1/1936 | Gelbman | 280/264 |
| 3,810,658 | 5/1974 | Weimer | 280/242 WC |
| 3,884,501 | 5/1975 | Elias et al. | |
| 4,151,892 | 5/1979 | Francken | 280/265 |
| 4,189,166 | 2/1980 | Lindsey | 280/234 |
| 4,319,760 | 3/1982 | Romano | |

FOREIGN PATENT DOCUMENTS

| 10942 | of 1891 | United Kingdom | 280/242 R |
|---|---|---|---|
| 459486 | 1/1937 | United Kingdom | |
| 1299959 | 12/1972 | United Kingdom | |
| 1453546 | 10/1976 | United Kingdom | |
| 1604404 | 12/1981 | United Kingdom | |

Primary Examiner—Richard J. Apley
Assistant Examiner—S. R. Crow
Attorney, Agent, or Firm—Cushman, Darby & Cushman

[57]         ABSTRACT

An exercise tricycle comprises a rear wheel, a one-way forward wheel, a front steering wheel and a brake mechanism which together provide the user with excellent exercise results. One of the user's feet is placed on the front wheel pedal, while the other foot is placed on the pedal between the two rear wheels. The user's two hands may pull two ropes to actuate the one-way forward wheel to drive the spindle and the rear wheels to cause the tricycle to move forwards. Steering and brake functions are performed by operating the front pedal assembly.

5 Claims, 7 Drawing Figures

EXERCISE TRICYCLE

BACKGROUND OF THE INVENTION

The function of current exercise vehicles both for indoors and outdoors is merely limited to exercising a given part of a person's body. For instance, if the exercise is emphasized on the foot, it will have little or no effect on the hands and other parts of the body. Further, the driving speed and the space of the current exercise vehicles are also limited. As a result, said vehicles may only be suitable for persons in a certain range of age. In other words, they do not conform with the principle that all people should exercise.

SUMMARY OF THE INVENTION

In view of the fact that current exercise vehicles are limited by space, speed, the possibility of hazardous operation, and inacceptance by most of the public, the inventor has, through careful studies and repeated experiences and improvements, developed this invention, which should widely be accepted by the public because of its excellent features.

The primary feature of this invention is that when a rope is pulled by hand, a rope reel will, through a spindle, drive a one-way forward wheel, causing the fixed rear wheels to rotate to cause the whole tricycle to move.

Another feature of this invention is that the front pedal of the tricycle is used for steering the front wheel so as to smoothly control the whole tricycle. When the rear end of the pedal is pushed downwards, a brake will be actuated to slow the tricycle.

A further feature of this invention is that the speed and the size of this invention may be varied in design so as to meet the requiremens of different environments (such as indoors or outdoors), and to be used by users of all ages and both sexes.

A still further feature of this invention is that its design is aimed at exercising the whole body, such as the hands, the feet, and other parts of the body.

A final feature of this invention is that it has three wheels, assuring safer operation of the tricycle by preventing it from being overturned when driven forwards.

DETAILED DESCRIPTION OF THE PREFERRED EMBODIMENT

Figure 1:
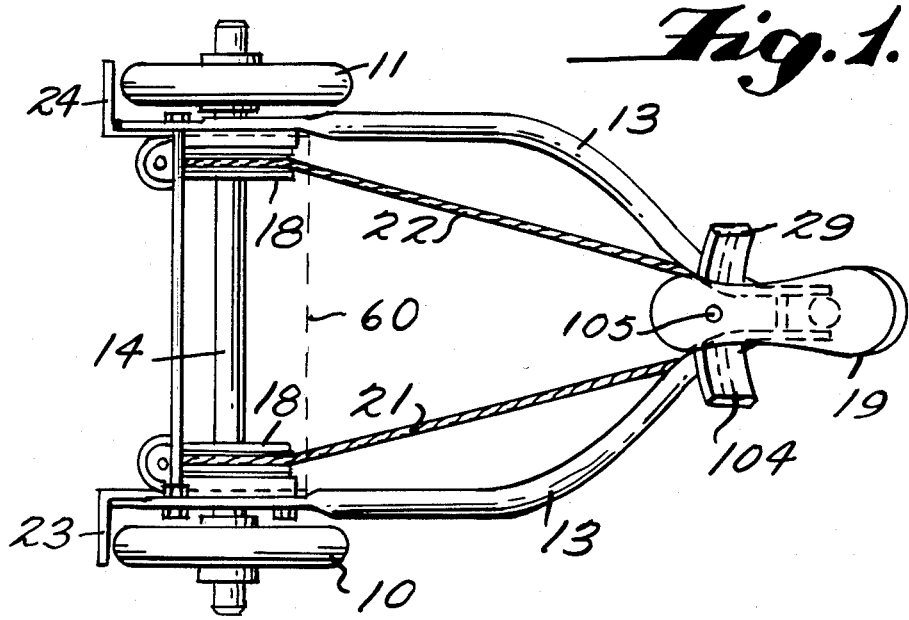
FIG. 1 shows a top view in plan of a presently preferred exemplary embodiment of this invention.
Figure 2:
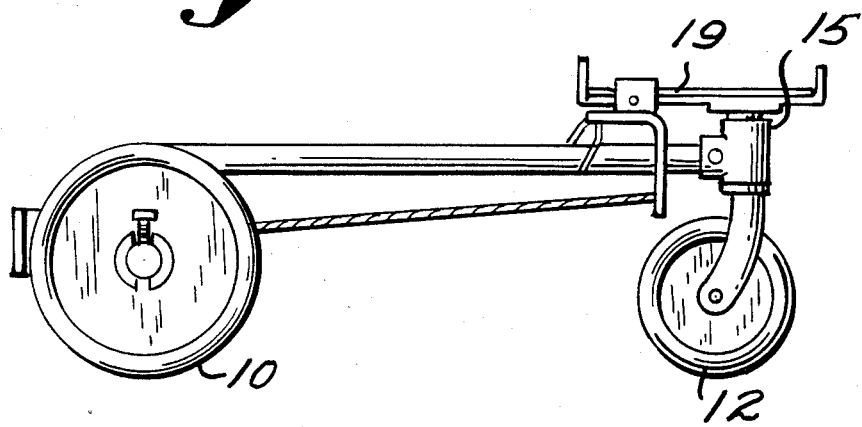
FIG. 2 shows a side elevational view of the embodiment of this invention shown in FIG. 1.
Figure 3:
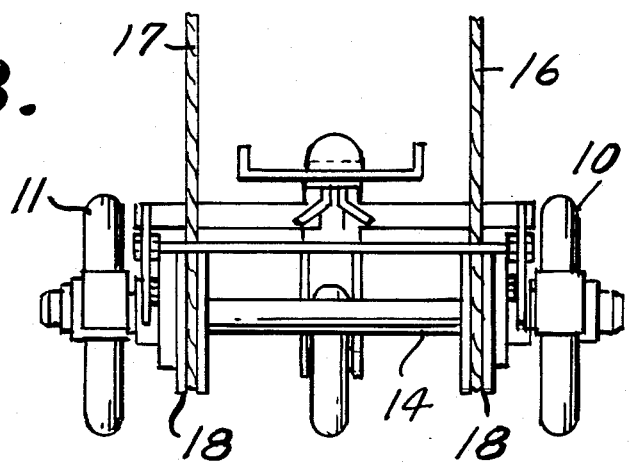
FIG. 3 shows a rear elevational view of the embodiment of this invention shown in FIG. 1.

This invention is further described in detail, by referring to the drawings attached, as follows:

As shown in FIGS. 1, 2, and 3, the presently preferred exemplary embodiment of the present invention is a three-wheeled vehicle, which comprises mainly a fixed rear wheel (10), a movable rear wheel (11), and a front wheel (12), which are used for supporting the weight of the vehicle and its passenger. A U-shaped steel tube (13) is used for connecting spindles (14, 15) together. When the user pulls the ropes (16, 17) (either one at a time, or both simultaneously), the rope reel (18) will be driven to rotate, and will actuate the spindle (14), which in turn drives the fixed rear wheel (10) to move forwards. Naturally, the movable rear wheel (11) will also move forwards because of the balance effect between the two rear wheels. The direction of the tricycle may be changed by means of the fixed and movable effect of the wheels. A pedal (19) is used for steering. In addition, the pedal (19) is used for applying a brake. When the rear end of pedal (19) is pushed down, steel ropes (21, 22) are pulled tightly to actuate the brake pieces (23, 24) respectively for gripping the two rear wheels.

Figure 4A:
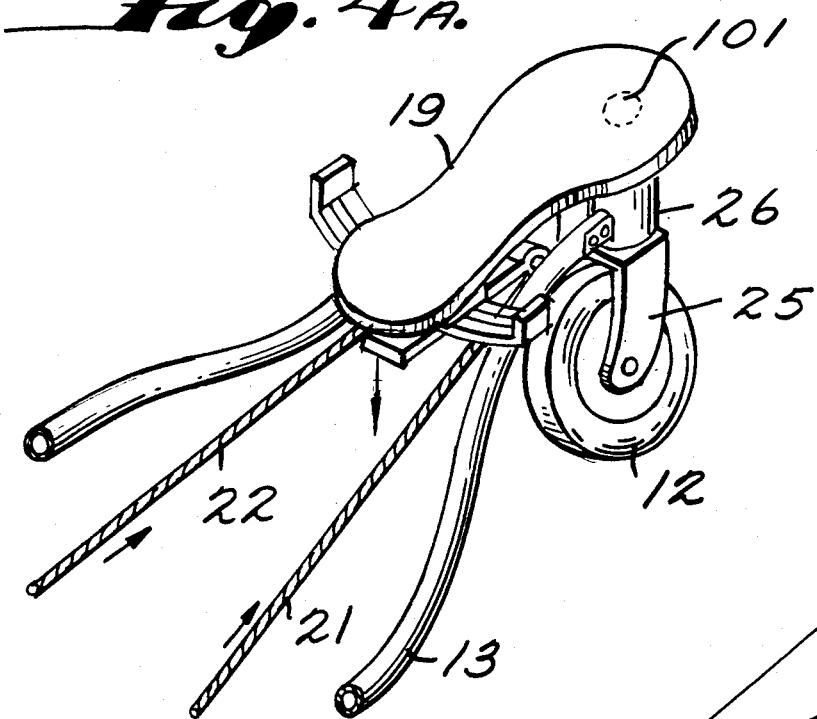
FIG. 4(A) show a perspective view of the front wheel mechanism of the embodiment of this invention shown in FIG. 1.

FIG. 4(A) shows the perspective view of the front wheel mechanism.

Figure 4B:
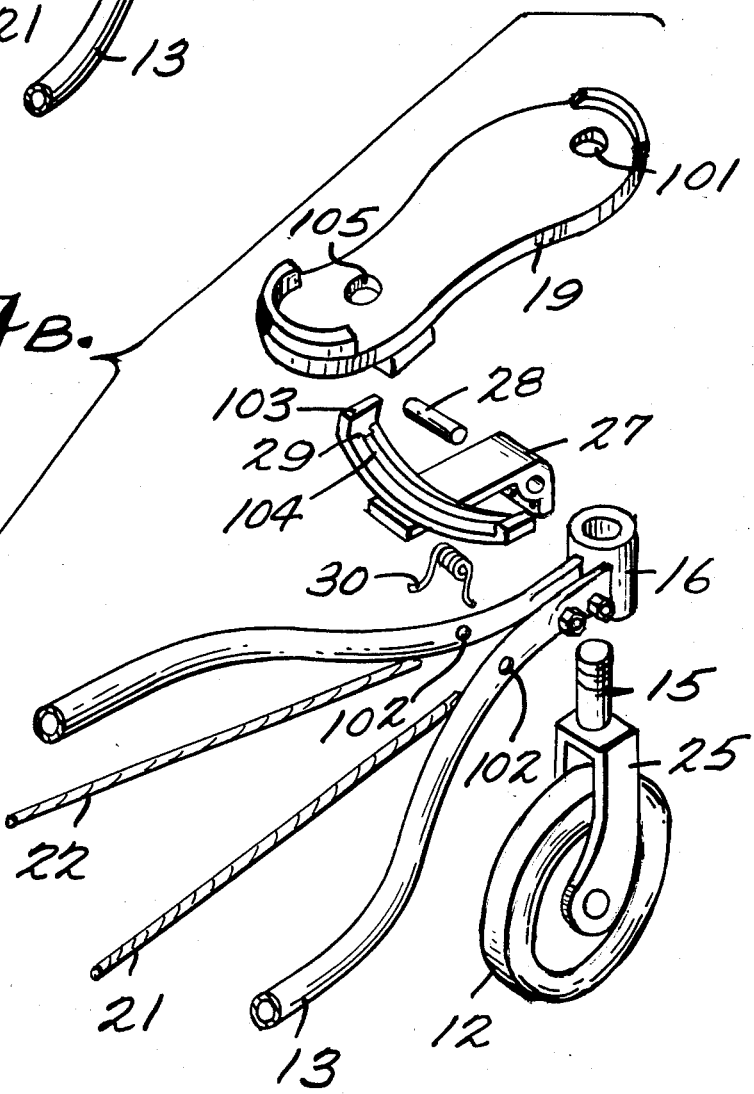
FIG. 4(B) shows an exploded perspective view of the front wheel mechanism shown in FIG. 4(A).

Referring to FIGS. 4(A) and 4(B), the front wheel (12) is fitted into the U-shaped fork (25), a terminal end of which is welded to a spindle (15) that goes through a bushing (26), and is fixedly attached to a spindle hole (101) of the pedal (19). Said bushing (26) is attached to the U-shaped steel tube (13), on which a round hole (102) is provided for fitting a pin (28) to install a connecting plate (27). On said plate (27), an arc-shaped control plate (103) is furnished respectively to limit the steering angle. The slot (104) on said plate (27) is used for inserting a steel ball (105) between the pedal (19) and said slot so as to control the steering angle of the front wheel (12) after said pedal (19) and the spindle (15) are fixedly assembled together. At the other end of said connecting plate (27), two steel ropes (21, 22) are connected. Each end of a spring (30) is attached to the steel tube (13). The center portion of spring (30) supprts the bottom of said connecting plate (27) so as to maintain balance under normal state. When the rear end of said pedal (19) is pushed downwards, the rear end of the connecting plate (27) will also be pushed downwards, causing its front to ascend to pull steel ropes (21, 22) to brake the two rear wheels.

Figure 5A:
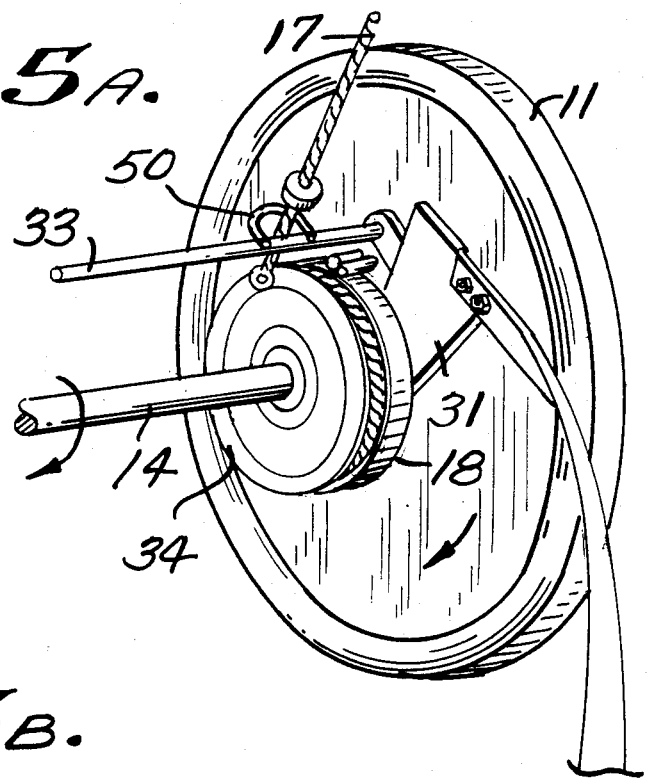
FIG. 5(A) shows a perspective view of the rear wheel mechanism of the embodiment of this invention shown in FIG. 1.
Figure 5B:
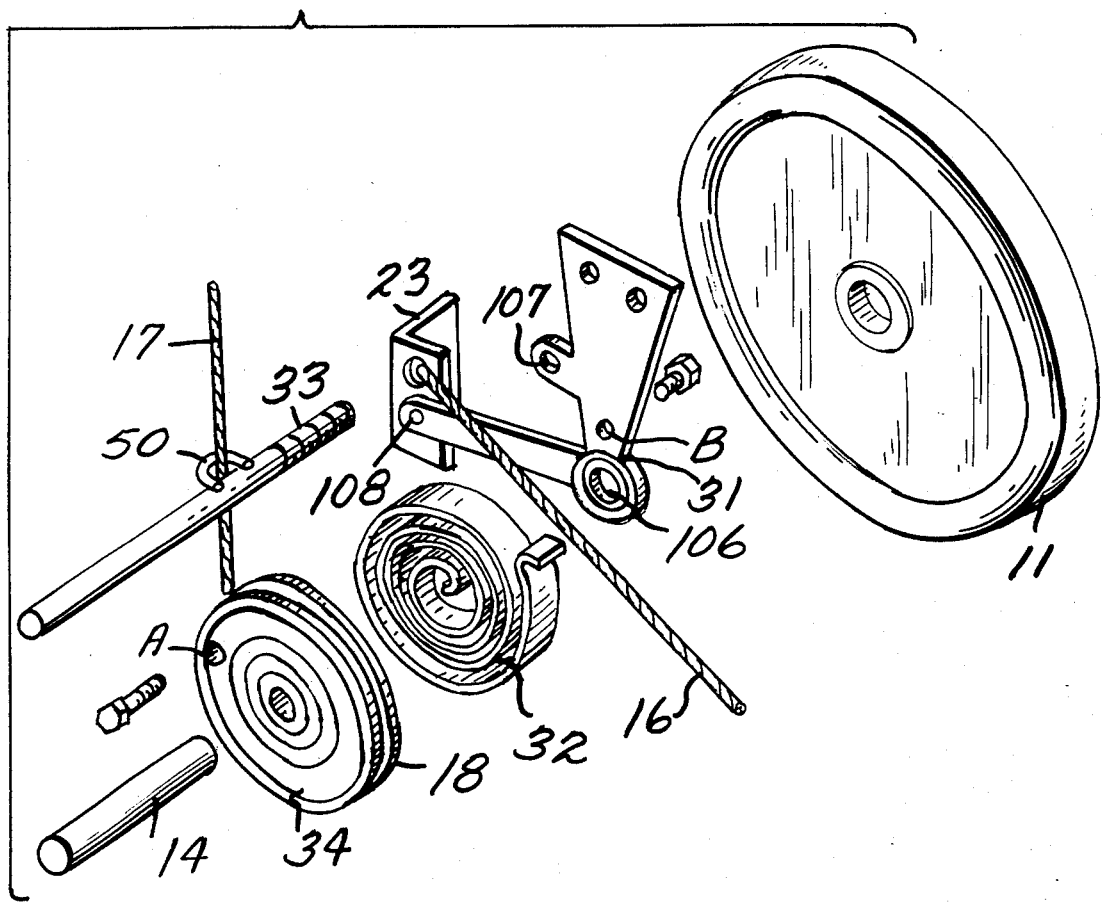
FIG. 5(B) shows an exploded perspective view of the rear wheel mechanism shown in FIG. 5(A).

FIGS. 5(A) and 5(B) show the rear wheel mechanism of this invention. Referring to FIGS. 1, 2, 5(A), and 5(B), the rear wheel mechanism comprises a fixed rear wheel (10) and a movable rear wheel (11), each being attached to one end of the spindle (14) respectively. Spindle (14) is put through the round hole (106) of a connecting plate (31) that has a number of other round holes. The round hole (107) is connected to a lateral shaft (33), while the round hole (108) is riveted to the brake piece (23). A spiral spring (32) encircles the spindle (14). One end of spring (32) is fixed to the spot "A" on the rope reel (18), and the other end is fixed to the spot "B" on said connecting plate (31). Around the groove of said rope reel (18), a rope (17 or 16) is wound with one end passing through a guide hole (50) on the lateral shaft (33) to the outside. Said rope reel (18) and the one-way forward wheel (34) are fixedly attached together. When the rope is pulled upwards, the rope reel (18) will be actuated to cause the one-way forward wheel (34), the spindle (14), the spiral spring (32), and the fixed rear wheel, etc. to rotate. When the rope is released, rope reel (18) will return to its original position as a result of the effect of spiral spring (32), but the spindle will not move because of a delicate mechanical action of the one-way forward wheel (34). Therefore, the rear wheel will always move forwards.

To operate the presently preferred embodiment of the present invention, one of the user's feet is placed on the front wheel pedal (19), while the other foot is placed on a foot pedal (not shown; indicated by dotted line 60 in FIG. 1) between the two rear wheels (10 and 11). The user's hands pull the two ropes (16 and 17), respectively, to actuate the one-way forward wheel (34) to rotate spindle (14) and thus rear wheels (10 and 11). Steering and braking is accomplished by operating front pedal (19). Safe operation and ideal exercise results are obtained.

I claim:

1. A vehicle for moving across a surface, said vehicle adapted for supporting a standing rider, said vehicle comprising:

a frame;

support means, journaled to said frame, for supporting a first foot of a standing rider;

three wheels, rotatably journaled to said frame, for supporting said frame and for moving said frame across said surface;

drive means, operatively coupled to at least a first of said three wheels and operable by the hands of a standing rider, for rotating at least said first wheel to propel said vehicle across said surface with force exerted by the hands of the rider; and pedal means, journaled to said frame and operatively connected to at least a second of said three wheels, for supporting the second foot of said standing rider, for controlling the axial orientation of said second wheel with respect to said frame to control the direction in which said vehicle moves across said surface, and for braking said vehicle.

2. A vehicle for moving across a surface, said vehicle adapted for supporting a standing rider, said vehicle comprising:

a frame;

support means, journaled to said frame, for supporting a first foot of a standing rider;

three wheels, rotatably journaled to said frame, for supporting said frame and for moving said frame across said surface;

drive means, operatively coupled to at least a first of said three wheels and operable by the hands of a standing rider, for rotating at least said first wheel to propel said vehicle across said surface with force exerted by the hands of the rider, said drive means including:

first wheel driving means for rotating said first wheel; and second wheel driving means for rotating a second of said three wheels;

wheel axle means for journaling said first and second wheels to said frame; and control means, journaled to said frame and operatively connected to at least a third of said three wheels, for supporting the second foot of said standing rider and for controlling the direction in which said vehicle moves across said surface, wherein:

said first wheel driving means comprises:

first ratchet means, rotatably journaled to said wheel axle means and operatively connected to said first wheel, for rotating in a first direction together with said first wheel and for rotating in a second direction opposite to said first direction independently of the rotation of said first wheel;

first rope means, a portion of which is wound onto said first ratchet means, for rotating said first ratchet means in said first direction when said first rope means is pulled by the hands of said rider to unwind said first rope means from said first ratchet means; and first biasing means, a first end of which is journaled to said first ratchet means and a second end of which is journaled to said frame, for rotating said first ratchet means in said second direction to wind said unwound portion of said first rope means back onto said first ratchet means when said first rope means is released by said rider; and wherein said second wheel driving means comprises:

second ratchet means, rotatably journaled to said wheel axle means and operatively connected to said second wheel, for rotating in a first direction together with said second wheel and for rotating in a second direction opposite to said first direction independently of the rotation of said second wheel;

second rope means, a portion of which is wound onto said second ratchet means, for rotating said second ratchet means in said second direction when said second rope means is pulled by the hands of said rider to unwind said second rope means from said second ratchet means; and second biasing means, a first end of which is journaled to said second ratchet means and a second end of which is journaled to said frame, for rotating said second ratchet means in said second direction to wind said unwound portion of said second rope means back onto said second ratchet means when said second rope means is released by said rider.

3. A vehicle for moving across a surface, comprising:

a frame;

support means, fixedly journaled to said frame, for supporting the first foot of a standing rider;

a wheel axle journaled to said frame;

first and second wheel means rotatably journaled to said wheel axle for supporting said frame as it moves across said surface;

drive means journaled to said wheel axle and operable by the hands of said rider, for rotating said first and second wheel means to propel said vehicle across said surface, said drive means including:

first wheel driving means for rotating said first wheel means, said first wheel driving means comprising:

first ratchet means, rotatably journaled to said wheel axle and operatively connected to said first wheel means, for rotating in a first direction together with said first wheel means, and for rotating in a second direction opposite to said first direction independently of the rotation of said first wheel means;

first rope means, a portion of which is wound onto said first ratchet means, for rotating said first ratchet means in said first direction when said first rope means is pulled by said rider to unwind said first rope means from said first ratchet means; and first biasing means, a first end of which is journaled to said first ratchet means and a second end of which is journaled to said frame, for rotating said first ratchet means in said second direction to wind said unwound portion of said first rope means into said first ratchet means when said first rope means is released by said rider; and second wheel driving means for rotating said second wheel means, comprising:

second ratchet means, rotatably journaled to said wheel axle and operatively connected to said second wheel means, for rotating in a first direction together with said second wheel means and for rotating in a second direction opposite to said first direction independently of the rotation of said second wheel means;

second rope means, a portion of which is wound onto said second ratchet means, for rotating said second ratchet means in said second direction when said second rope means is pulled to unwind said first rope means from said second ratchet means; and second biasing means, a first end of which is journaled to said second ratchet means and a second end of which is journaled to said frame, for rotating said second ratchet means in said second direction to wind said unwound portion of said second rope means onto said second ratchet means when said rope means is released by said rider;

steering means for controlling the direction in which said vehicle moves across said surface, comprising:

at least third wheel means for supporting said frame as it moves across said surface, the axial position of said third wheel means with respect to said frame controlling the direction in which said vehicle moves across said surface;

fork member means rotatably journaled to said frame, said third wheel means being rotatably journaled to said fork member means, said fork member means for changing the axial position of said third wheel with respect to said frame; and control means, operatively coupled to said steering means, for supporting the second foot of said rider, for controlling said axial position of said third wheel with respect to said frame, and for braking said vehicle, said control means including:

pedal means, journaled to said fork member means, for rotating together with said fork member means and for pivoting in a direction different from the direction in which said pedal means rotates together with said fork means, said pedal means being manipulated by the second foot of said rider;

a ball fixed to said pedal means;

control plate means, journaled to said frame, having means defining a arcuate slot into which said ball is disposed, said control plate means for restricting the rotation of said pedal means together with said fork member means to an arc;

at least one braking plate means, pivotably journaled to said frame, said braking plate means for pivoting between a first and second position, said braking plate means rubbing against one of said wheels when pivoted into a first position; and cable means, operatively connecting said pedal means to said braking plate means, for pivoting said braking plate means into said first position to rub against said wheel when said pedal means is pivoted by the second foot of said rider.

4. A vehicle as in claim 3 wherein the portion of said first rope means unwound from said first ratchet means and the portion of said second rope means unwound from said second ratchet means are substancially vertical with respect to said surface.

5. A vehicle as in claim 4 further including:

first handle means, attached to an extremity of said first rope means, for being grasped by a first hand of said rider; and second handle means, attached to an extremity of said second rope means, for being grasped by a second hand of said rider.

* * * * *